Figure 1:
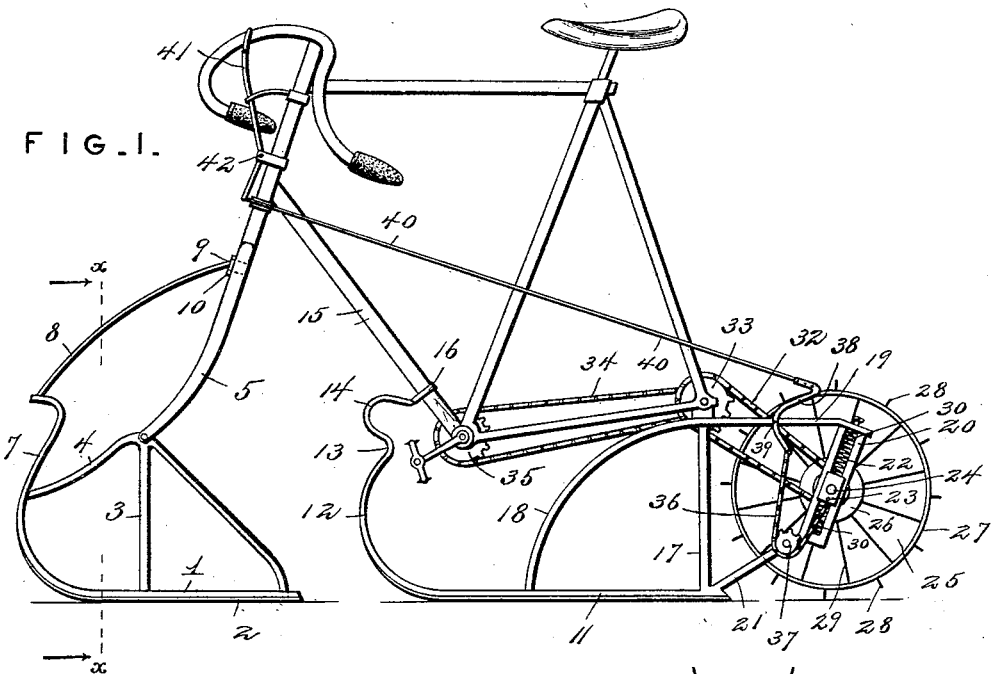

No. 633,030. Patented Sept. 12, 1899.
A. NELSON.
SLED ATTACHMENT FOR BICYCLES.
(Application filed June 15, 1899.)
(No Model.)

Witnesses
H. L. Ames.
R. M. Smith.

Inventor
Alfred Nelson.
By V. D. Stockbridge.
His Attorney

THE NORRIS PETERS CO., PHOTO-LITHO., WASHINGTON, D. C.

UNITED STATES PATENT OFFICE.

ALFRED NELSON, OF HELENA, MONTANA.

SLED ATTACHMENT FOR BICYCLES.

SPECIFICATION forming part of Letters Patent No. 633,030, dated September 12, 1899.

Application filed June 15, 1899. Serial No. 720,645. (No model.)

*To all whom it may concern:*

Be it known that I, ALFRED NELSON, a citizen of the United States, residing at Helena, in the county of Lewis and Clarke and State of Montana, have invented a certain new and useful Sled Attachment for Bicycles, of which the following is a specification, reference being had therein to the accompanying drawings.

This invention relates to sled attachments for bicycles; and the object in view is to provide runners which may be readily applied to and detached from the frame of an ordinary safety-bicycle, the said runners being adapted to be used in place of the bicycle-wheels when it is desired to adapt the machine for use upon snow or ice.

The invention also contemplates novel means for rendering the runners self-adjusting to inequalities of the surface over which the vehicle is being propelled, and also provides for readily adjusting the driving-wheel, so that it may be caused to operate with greater or less traction on the surface being traveled over.

The detailed objects and advantages of the invention will be more fully described hereinafter.

The invention consists in a sled attachment for bicycles and vehicles of a like character, embodying certain novel features and details of construction and arrangement of parts, as hereinafter fully described, illustrated in the drawings, and incorporated in the claims.

Figure 4:
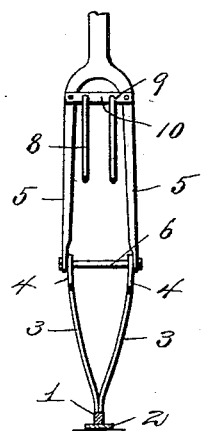
Figure 3:
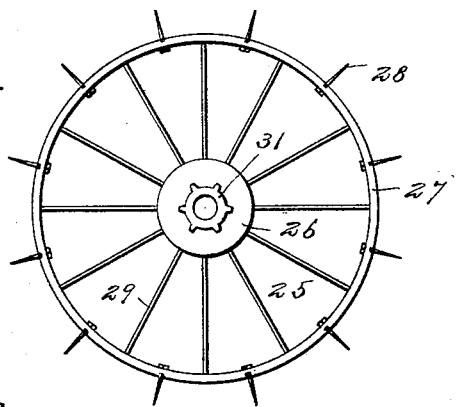
Figure 2:
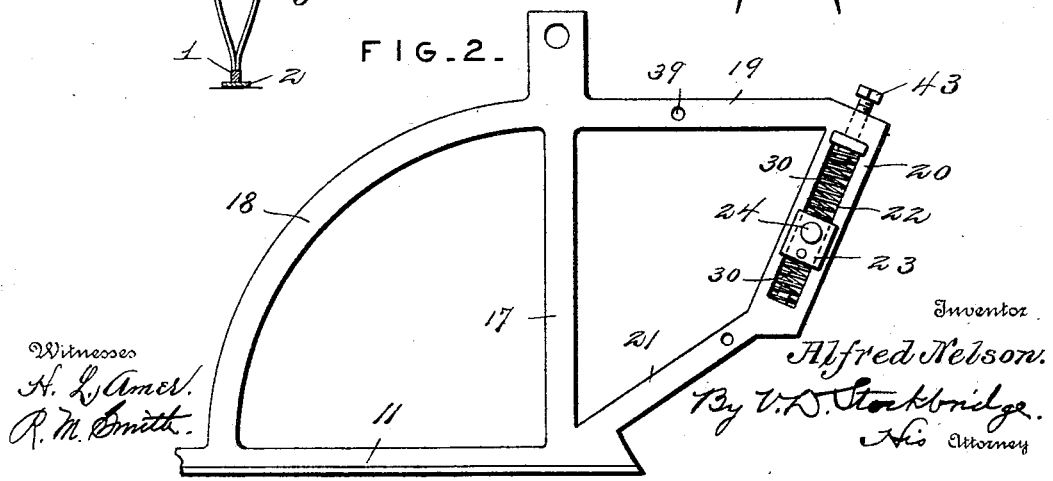

In the accompanying drawings, Figure 1 is a side elevation showing a bicycle-frame with the wheels detached and the runners applied thereto, showing also the propelling means. Fig. 2 is an enlarged detail view of a portion of the rear runner. Fig. 3 is a side elevation of the spiked driving-wheel. Fig. 4 is a cross-section on the line $x\ x$ of Fig. 1.

Similar numerals of reference designate corresponding parts in the several figures of the drawings.

The front runner (indicated at 1) is single as to that portion which bears upon the snow or ice and is preferably made quite narrow, like a skate-runner, for use upon ice and has detachably connected thereto a wide tread or shoe 2, which may be several inches in width, for use upon snow. Extending upward from the runner 1 are upwardly-diverging uprights or standards 3, the upper ends of which are connected to the runner 1 by means of downwardly-diverging obliquely-disposed braces 4, said braces being arranged in opposing pairs. The distance between the upper ends of the uprights 3 and braces 4 is such that they can be secured to the lower extremities of the front-fork blades 5 by means of the usual axle or pin 6 after the steering-wheel of the bicycle has been removed. The runner 1 is curved upward and forward in gooseneck form, as shown at 7, and connected to the extreme upper end of the runner 7 is a pair of curved rods 8, of spring material, the rear ends of which pass through openings 9, spaced a suitable distance apart and arranged in a cross-bar or yoke 10, connected at its opposite end in any convenient manner to the fork-blades 5. The rear extremities of the rods 8 are headed or provided with suitable nuts to prevent said rods from escaping from the openings 9. These rods serve to limit the downward movement of the front end of the forward runner while allowing said end of the runner to yield upward, thereby enabling said runner to accommodate itself automatically to any inequalities or undulations of the surface over which the vehicle is being propelled.

The rear runner (indicated at 11) is single and constructed in a manner similar to the forward runner hereinabove described. The front portion of the runner 11 is curved upward, as shown at 12, in subtantially semicircular form and then bent at the point 13 in a reverse direction, from which point it is extended forward and given a U-shaped bend 14, forming a resilient portion, the extremity of which is secured to the reach-bar 15 of the machine by means of a clip 16 or in any convenient manner. The U-shaped spring portion 14 admits of an up-and-down yielding movement of the forward end of the rear runner for a purpose similar to that described in connection with the forward runner.

At the rear end of the runner 11 the latter is provided with upwardly-diverging uprights 17, which are connected at their upper ends to curved or segmental braces 18, which extend forward and merge at their lower ends into the central portion of the runner 11. Extending rearward from the uprights 17 are substantially parallel arms 19, which connect at their rear ends with oppositely-located slotted plates or bars 20. These bars 20 incline slightly forward toward their lower ends and are connected at such ends with the heel end of the runner 11 by means of parallel oblique braces or stays 21. The bars 20 are provided with longitudinal slots 22, in which move boxes or bearings 23, and in said boxes are journaled the ends of a transverse shaft 24, upon which is mounted a driving-wheel 25, consisting of a hub 26 and rim 27, provided with radiating spikes 28 and connected to the hub by ordinary spokes 29. Above and below the boxes 23 are located springs 30, which serve to normally maintain the boxes 23 in a position where the ends of the spikes 28 will be out of engagement with the snow or ice.

Upon the hub of the driving-wheel 25 is a sprocket-pinion 31 to receive a sprocket-chain 32, which passes over a sprocket-wheel 33 on the axle located in the same place as the ordinary rear axle of the machine. The sprocket-wheel 33 has fixedly connected thereto a sprocket-pinion, over which runs a chain 34, reaching around the driving sprocket-wheel 35 of the bicycle. By the mechanism just described rotary motion may be imparted by the rider while in the saddle to the spiked driving-wheel 25. Connected to the boxes 23 on each side of the wheel 25 are sprocket-chains 36, which pass downward and around idle pinions 37, journaled on the oblique braces or stays 21, hereinabove described. The chains then pass upward, where they connect with the lower ends of a bifurcated elbow-lever 38, fulcrumed at 39 on the arms 19 and connected by a rod or wire 40 with the lower end of a hand-lever 41, fulcrumed intermediate its ends at 42 on the head of the machine.

From the foregoing description it will be apparent that the rider by rocking the hand-lever 41 will impart a corresponding movement to the elbow-lever 38, thereupon drawing upon the chain 36 and forcing downward the boxes 23, carrying the shaft of the driving-wheel. This of course forces the spiked driving-wheel into closer engagement with the surface over which the vehicle is being propelled and obtains a greater hold. When sufficient speed has been attained, the hand-lever may be released, whereupon the springs 30 will act to throw the driving-wheel upward out of engagement with the snow or ice, which will permit the rider to coast. The parts will also assume this normal position when the rider is coasting downgrade. The particular manner of connecting the forward ends of both runners with the machine-frame is a very important feature, as it renders the runners self-adjusting and enables them to automatically accommodate themselves to any inequalities in or undulations of the surface being traveled over, at the same time serving to absorb vibration imparted to the runners and preventing the same from being communicated to the machine-frame and thence to the rider. The tension of the springs 30 may be regulated by means of tension-screws 43, passing into and through the upper ends of the slotted bars 20 and engaging the springs 70 for compressing the latter more or less.

I do not desire to be limited to the exact details of construction and arrangement hereinabove set forth, but reserve the right to change, modify, or vary the construction within the scope of this invention.

Having thus described the invention, what is claimed as new, and desired to be secured by Letters Patent, is—

1. The combination with the front fork of a bicycle, of a runner pivotally connected thereto, and a rod connected to the forward end of the runner and having a sliding engagement with the fork at or near its rear end, substantially as and for the purpose specified.

2. The combination with the front fork of a bicycle, of a runner pivotally connected thereto and extending in advance thereof, and a pair of curved rods connected to the forward end of the runner and extending rearward through guides, said rods having a sliding engagement with the front fork, substantially as and for the purpose specified.

3. The combination with a runner adapted to be applied to an ordinary safety-bicycle, and having a single tread, of slotted bars arranged in rear of the heel end of the runner, a spiked driving-wheel journaled in boxes slidingly fitted in said slotted bars, springs for sustaining said boxes in position to hold the driving-wheel out of operation, means for imparting motion to said driving-wheel, an idle pulley journaled on the runner-frame, a chain connected to one of the sliding boxes of the driving-wheel and passing around said pulley, and connections from said chain to a point within reach of the rider while in the saddle, substantially as and for the purpose specified.

4. The combination with the frame of a bicycle, of a runner detachably connected thereto, parallel horizontal arms extending rearward from the upper portion of said runner, inclined slotted bars connected to said arms, oblique braces connecting said slotted bars with the heel ends of the runners, sliding boxes fitted in said slotted bars, a spiked driving-wheel journaled in said boxes, means for propelling said wheel, springs for sustaining said boxes in proper position to hold the wheel inoperative, chains connected to said boxes, an elbow-lever connected to said chains and fulcrumed on the runner-frame, and connections leading from said elbow-lever to a point within convenient reach of the rider while in the saddle, substantially as and for the purpose specified.

In testimony whereof I affix my signature in presence of two witnesses.

ALFRED NELSON.

Witnesses:
ARTHUR J. CRAVEN,
L. C. NELSON.